United States Patent Office.

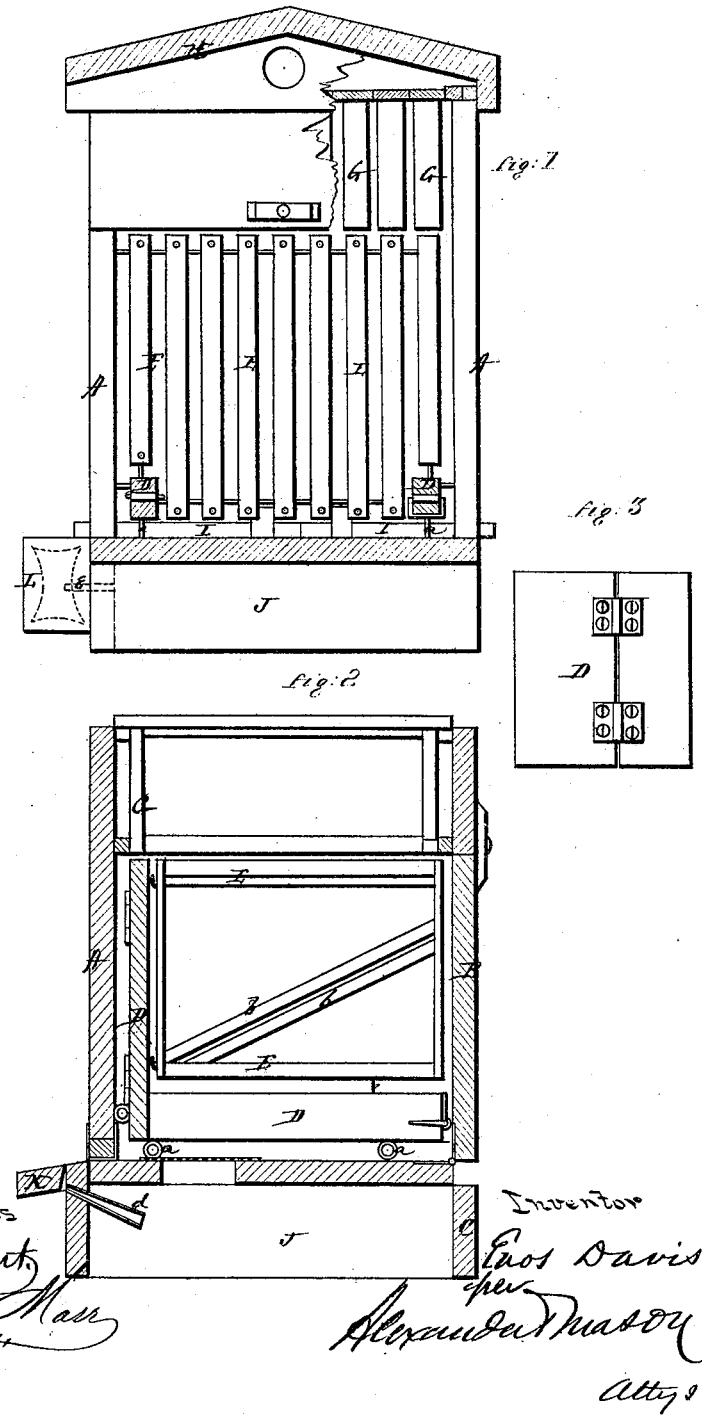

ENOS DAVIS, OF NOBLESVILLE, INDIANA.

Letters Patent No. 107,012, dated September 6, 1870.

IMPROVEMENT IN BEE-HIVES.

The Schedule referred to in these Letters Patent and making part of the same

*To all whom it may concern:*

Be it known that I, ENOS DAVIS, of Noblesville, in the county of Hamilton and in the State of Indiana, have invented certain new and useful Improvements in Bee-Hives; and do hereby declare that the following is a full, clear, and exact description thereof, reference being had to the accompanying drawing and to the letters of reference marked thereon, making a part of this specification.

The nature of my invention consists in the construction and arrangement of a "bee-hive," as will be hereinafter fully set forth.

In order to enable others skilled in the art to which my invention appertains to make and use the same, I will now proceed to describe its construction and operation, referring to the annexed drawing, in which—

Figure 1 is a rear view, the door being removed;
Figure 2 is a longitudinal vertical section; and
Figure 3 is a reduced front view of the support for the main frames.

A represents the hive, of any suitable dimensions, provided on its rear side with a door, B, which opens downward.

This door is fastened with hinges, and is supported in a horizontal position by a bar, C, and forms a table or base on which the support D for the main frames is drawn out.

The support D is formed of a vertically bisected back, fastened together with hinges, as shown in fig. 3, and two horizontal bars at the foot or base of said back.

The main frames E E are hinged on the upright back of the support D, and the construction of said supports allows the frames to spread open, so that any one of the frames may be removed without removing the balance.

The support D is raised off the floor by means of screw-eyes *a a*.

The door B is easily adjusted so as to form the base or table, and then shuts up, forming a part of the bee-hive proper.

The stays *b b* in the main frames E E or comb-guides are placed at an angle of about forty degrees, thereby giving greater strength to the frames.

Above the main frames are the necessary frames G G, for the honey, the whole being covered by the lid H.

The entrance-slides I I are so arranged that the entrance-hole may be elongated, and gives more room for the bees to enter, but does not make it any larger up and down.

The sides of the hive extend below the floor a suitable distance, so that, by placing the hive on a smooth base, the miller-chamber J will be formed.

The alighting-board K is to be removed a little off, so as to admit a miller and not a bee.

Underneath the alighting-board K, in the center, is an elongated tube, *d*, extending into the miller-chamber J.

Then, seeing the light from the glass trap L, on the outside of the hive, they will go into the same.

The tube *e*, leading into said trap, being small, and in the center extending in some distance, they will not be able to get out.

This glass trap may be filled nearly half full with water.

Having thus fully described my invention,
What I claim as new, and desire to secure by Letters Patent, is—

The hive A, door B, support D, frames E E and G G, slides I I, alighting-board K, glass trap L, and tubes *d e*, all constructed and arranged substantially as and for the purposes herein set forth.

In testimony that I claim the foregoing, I have hereunto set my hand this 25th day of April, 1870.

ENOS DAVIS.

Witnesses:
FRANCIS M. TRISSAL,
WILLIAM O'BRIEN.